United States Patent [19]
Boyle et al.

[11] Patent Number: 6,063,280

[45] Date of Patent: May 16, 2000

[54] BIODEGRADATION OF METHANESULFONIC ACID

[75] Inventors: Robert Boyle, Waterford, Ireland; Edamanal S. Venkataramani, Somerset, N.J.

[73] Assignee: Merck & Co., Inc., Rahway, N.J.

[21] Appl. No.: 08/191,242

[22] Filed: Feb. 2, 1994

[51] Int. Cl.[7] .................................................. C02F 9/14

[52] U.S. Cl. ........................... 210/610; 210/631; 210/908

[58] Field of Search ..................................... 210/610, 611, 210/624, 631, 908; 435/821, 262.5, 287, 245

[56] References Cited

U.S. PATENT DOCUMENTS

| 3,660,278 | 5/1972 | Mimura et al. | 210/611 |
| 3,756,947 | 9/1973 | Fuji et al. | 210/611 |

OTHER PUBLICATIONS

Baker et al., Microbial degradation of methanesulphonic acid:, Apr. 18, 1991, NATURE, vol. 350, pp. 627–628.

*Primary Examiner*—Thomas G. Wyse
*Attorney, Agent, or Firm*—Anthony D. Sabatelli; Joanne M. Giesser

[57] ABSTRACT

A process is described for the acclimation and enrichment of an activated sludge culture for the degradation of high concentrations of methanesulfonic acid, so as to render it non-toxic to the aquatic environment.

1 Claim, No Drawings

BIODEGRADATION OF METHANESULFONIC ACID

BACKGROUND OF THE INVENTION

Microbial degradation of methanesulfonic acid (MSA) is a missing link in the biogeochemical sulfur cycle. Atmospheric dimethyl sulfide, arising from marine algae, cyanobacteria and salt marsh plants is the principal sulfur compound entering the atmosphere from aquatic and terrestrial environments. MSA has been identified as a major product of the photochemical oxidation of dimethyl sulfide in the atmosphere. Dimethyl sulfide and MSA are predominantly biogenic in origin and are the main gaseous links in the biogeochemical sulfur cycle. MSA is a stable compound and does not undergo photochemical decomposition. Removal of MSA from the atmosphere is by wet and dry deposition. MSA partitions into aerosol, in nucleating droplet formation and is deposited in rain and snow. Analysis of Antarctic ice cores gives evidence of its global deposition over many thousands of years.

The search for methylotrophs and sulfur bacteria, able to derive energy from the degradation of MSA, has recently been revealed. Organisms that are involved in the microbial degradation of MSA are identified as facultatively heterotrophic methylotrophs and include *Escherichia coli* K-12 and *Chlorella fusca*.

However, information on the fate of MSA in wastewater is almost nonexistent. It has been determined, using *Daphnia magna* toxicity assay, that pure MSA has an $LC_{50}$ of only 2 mg/L. Therefore, MSA in wastewater poses significant environmental problems in the form of aquatic toxicity. A waste treatment system for MSA degradation to non toxic levels is highly desirable. Unfortunately, there has been no adequate secondary liquid waste treatment system for MSA degradation. Although, as noted above, reports describe microbial degradation of MSA, they are confined to low concentration inherent biodegradability of the compound in a laboratory scale, not high concentration secondary liquid waste treatment. Further, biodegradation of MSA in a typical activated sludge treatment system has not been taught or suggested. The present invention establishes use of a continuous, acclimated activated sludge culture that removes up to 99% of MSA in a secondary liquid waste treatment system at concentrations as high as 1000 mg/L MSA. The acclimated system of the present invention has also been found to utilize MSA as the sole source of carbon for growth and energy, at concentrations as high as 1000 mg/L.

SUMMARY OF THE INVENTION

By this invention, there is provided a process for the acclimation of activated sludge culture for the biodegradation of methanesulfonic acid (MSA). This invention is also directed to a continuous process for the treatment of wastewater containing high concentrations of MSA that comprises:

a) Acclimating activated sludge; and
b) Adding increasing concentrations of methanesulfonic acid in wastewater; and
c) Adjusting and maintaining solution pH from about 6.5 to about 8.0; and
d) Maintaining influent biological oxygen demand from about 250 to 3500 mg/L; and
e) Maintaining a hydraulic residence time from about 40 to about 60 hours; and
f) Maintaining a sludge density from about 4 to about 7 g/L; and
g) Discharging methanesulfonic acid deficient effluent.

DETAILED DESCRIPTION OF THE INVENTION

The present invention is directed to a process for the acclimation of an activated sludge culture that is capable of degrading high concentrations of methanesulfonic acid (MSA). The present invention is also directed to an aerobic biological liquid waste treatment process that is designed to degrade MSA in wastewater utilizing an acclimated activated sludge culture.

For the purposes of this invention "activated sludge culture" shall mean a mixed microbial population of activated sludge treatment plant origin.

For the purposes of this invention "acclimated activated sludge culture" shall mean an activated sludge culture that has been exposed to increasing amounts of a chemical to serve as a carbon source and/or an energy source over a fixed period of time while feeding the sewage sludge microbial community with raw or synthetic sewage.

For the purposes of this invention "biodegradation" shall mean the microbial mediated process of breakdown of a chemical which serves as a carbon or energy source.

For the purposes of this invention "Centrum vitamin solution" shall mean a liquid comprising 166.7 I.U. vitamin A, 2.0 I.U. vitamin E, 4.0 mg vitamin C, 0.1 mg vitamin $B_1$, 0.1 mg vitamin $B_2$, 0.4 mcg vitamin $B_{12}$, 26.6 I.U. vitamin D, 20 mcg biotin, 0.7 mg pantothenic acid, 10 mcg iodine, 0.6 mg iron, 0.02 mg zinc, 0.17 mg manganese, 1.6 mcg chromium, 1.6 mcg molybdenum per ml.

For the purposes of this invention "hydraulic residence time (HRT)" shall mean the time that a given liquid spends in a vessel.

Preferably, this invention comprises acclimating activated sludge; adding methanesulfonic acid; maintaining solution pH from about 6.5 to 8.0; maintaining biological oxygen demand from about 250 to 3500 mg/L; maintaining hydraulic residence time from about 40 to 60 hours; maintaining a sludge density from about 4 to about 6 g/L; and discharging methanesulfonic acid deficient effluent.

The acclimation of the activated sludge culture involves a stepwise addition of increasing concentrations of a carbon source over time and establishing the extent of biodegradation of the carbon source.

More specifically, the acclimation of the activated sludge culture of the present invention involves a stepwise addition of increasing concentrations of MSA in the presence of an additional carbon source over time and establishing the extent of biodegradation of MSA and the additional carbon source.

Preferably, the present invention involves the stepwise addition of MSA beginning with about 25 mg/L and ultimately maintaining steady state conditions to effect quantitative biodegradation of MSA at each stepwise increase in MSA concentration. This is normally achieved in about three to about ten days.

The acclimation of the activated sludge culture is initiated by securing inocula of activated sludge from domestic and industrial wastewater treatment facilities. The activated sludge is then grown in nutrient media that lacks sulfur containing compounds, such as magnesium sulfate. However, in order to maintain the ionic balance of the medium, the chloride salt of a metal compound may be used as a replacement for the magnesium sulfate. This nutrient media is supplemented with Centrum vitamin solution that provides essential organic micronutrients and minerals to the microorganisms for growth. In the present case, ethanol and methanol served as the additional, easily metabolizable carbon source.

Acclimation of the activated sludge culture requires using from about 5 to about 50 mg/L MSA, preferably 40 mg/L MSA in this nutrient medium. Total sludge density in the reactor is maintained in the range of about 4.6 to about 7.8 g/L, preferably at about 6 g/L by appropriate wasting of mixed liquor suspended solids (MLSS). The hydraulic residence time for the acclimated activated microbial population in the continuous culture reactor is maintained from about 40 to 60 hours, preferably about 60 hours. The pH is maintained between 6.5 and 8.0, preferably about 7.2.

MSA concentration in the reactor is increased when biodegradation in the reactor for the current MSA concentration is generally >99% for at least three consecutive days. The amount of the increase ranges from 25 to 100% MSA with the maximum concentration at 2000 mg/L MSA. Percent biodegradation of MSA is monitored using direct ion chromatography. In order to confirm MSA biodegradation, effluent sulfate generation is also monitored via direct ion chromatography. Theoretically, the sulfate to MSA mole balance is 1:1.

Total organic carbon (TOC) and total oxygen demand (TOD) parameters are used as indirect measurements of the acclimated activated microbial growth and degradation performance during acclimation and degradation of MSA in steady state. TOC removal is generally from about 72 to 97% and TOD removal is generally from about 77 to 99%. Percent TOC and TOD removal efficiency increases as the system is well acclimated before challenging with increasing concentrations of MSA.

EXAMPLE 1

ACCLIMATION OF ACTIVATED SLUDGE CULTURE USING MSA AND CONTINUOUS BIODEGRADATION OF HIGH CONCENTRATIONS OF MSA IN LIQUID WASTE

About 1.0 L of activated sludge culture from internal and POTW sources was added to a 2.95 L bioreactor. The activated sludge culture was grown in a nutrient media that comprised 6.0 mg/L $KNO_3$, initially 750.0 mg/L $NaHCO_3$, 25.0 mg/L $NaH_2PO_4$, 4.0 mg/L KCl, 1600.0 mg/L $MgCl_2 \cdot 6H_2O$, 40.0 mg/L $FeCl_3 \cdot 6H_2O$, 2.0 mg/L $CaCl_2$, 2.0 mg/L $ZnCl_2$, 20.0 mg/L $MnCl_2 \cdot 4H_2O$, 2.4 mg/L $CuCl_2 \cdot 2H_2O$, 0.080 mg/L $CoCl_2 \cdot 6H_2O$, 0.040 mg/L $H_3BO_3$, 0.028 mg/L $Na_2MoO_4 \cdot 2H_2O$, 160.0 mg/L Bacto® beef extract, 110.000 mg/L Bacto® peptone, 90.000 mg/L urea, 15.000 mg/L Bacto® yeast extract, 473.400 mg/L ethanol, 477.600 mg/L methanol, 1000.000 mg/L Centrum liquid vitamins, 40.000 mg/L MSA. However, $NaHCO_3$ was used as a buffer and its concentration was adjusted from about 750.0 to 1500 mg/L to maintain a reactor pH from about 6.5 to 8.0, preferably 7.2. Aeration of the continuous culture was accomplished by forced air pumped into the bioreactor from the bottom. The HRT of the activated sludge culture was maintained at about 60 hours using a peristaltic pump. The ratio of aeration to solid settling volume was about 7.0. The solids in the reactor were maintained at about 6.0 g/L by appropriate wasting of MLSS through the stopcock port located at the bottom of the reactor.

The components of the media in the bioreactor were constantly monitored by taking about 10.0 mL samples and subjecting these samples to direct ion chromatography. Specifically, MSA degradation, sulfate generation, TOC, TOD and TS were monitored. Once MSA biodegradation reached >98% for at least three consecutive days, the amount of MSA in the media was increased to the next level. Specifically, the stepwise additions of MSA for the acclimation of the activated cultures comprised 75, 100, 150, 200, 250, 500, and 1000 mg/L MSA. TOC and TOD removal rates were from 72–99%, respectively. Steady state operation of the acclimated activated sludge culture was attained after about three to five residence times. Indicia of steady state were the amount of biodegradation of MSA, sulfate generation, TOC, TOD and TS within the aforementioned parameters. Once steady state was attained, the culture could be maintained indefinitely provided TOC, TOD, sludge density, pH, MSA concentration and MLSS parameters were strictly maintained. The effluent from the reactor during steady state operation contained $\leq 2\%$ of the influent MSA concentration.

EXAMPLE 2

USE OF MSA AS THE SOLE CARBON SOURCE FOR GROWTH AND ENERGY

The processes described in Example 1 can be used without the addition of ethanol and methanol to the media. However, the nutrient addition is balanced for the reduced carbon source. The activated sludge culture was grown in a nutrient media that comprised 6.0 mg/L $KNO_3$, initially 750.0 mg/L $NaHCO_3$, 25.0mg/L $NaH_2PO_4$, 4.0 mg/L KCl, 1600.0 mg/L $MgCl_2 \cdot 6H_2O$, 40.0 mg/L $FeCl_3 \cdot 6H_2O$, 2.0 mg/L $CaCl_2$, 2.0 mg/L $ZnCl_2$, 20.0 mg/L $MnCl_2 \cdot 4H_2O$, 2.4 mg/L $CuCl_2 19$ $2H_2O$, 0.080 mg/L $CoCl_2 \cdot 6H_2O$, 0.040 mg/L $H_3BO_3$, 0.028 mg/L $Na_2MoO_4 \cdot 2H_2O$, 160.0 mg/L Bacto® beef extract, 110.0 mg/L Bacto® peptone, 90.0 mg/L urea, 15.0 mg/L Bacto® yeast extract, 473.4 mg/L ethanol, 477.6 mg/L methanol, 1000.0 mg/L Centrum liquid vitamins, 40.0 mg/L MSA. However, $NaHCO_3$ was used as a buffer and its concentration was adjusted from about 750.0 to about 1500 mg/L to maintain a reactor pH from about 6.5 to 8.0, preferably 7.2. The Stepwise addition of MSA for acclimation comprised 100, 200, 250, 500, 1000, and 2000 mg/L MSA.

EXAMPLE 3

Large Scale Wastewater Treatment of MSA

In the large scale, 3 completely mixed aeration basins, operating in parallel, were acclimated to MSA. The operating parameters utilized were: Aeration volume $=4.5 \times 10^6 L$, MLSS=5.8–6.2 g/L, Dissolved Oxygen (DO)=4–6.5 mg/L, T=13–15° C., HRT=2.4 days (60 hours), pH=6.9–7.2. The BOD of the influent was maintained at 1500 mg/L using Methanol, Ethanol and plant waste components. The Nitrogen and Phosphorous were maintained at 30–40 and 4–8 mg/L, respectively.

Large scale wastewater acclimation to MSA was prepared utilizing 20 mg/L MSA as the initial concentration. Influent concentration of MSA was increased when the MSA level in the effluent was <1 mg/L. MSA levels were monitored using Ion Exchange Chromatography. The MSA concentration in the influent was eventually increased to about 250 mg/L (about 450 kg/day) in about 2–3 weeks. During this period of slow acclimation, MSA degradation was >98% for each and every concentration. The well acclimated activated sludge could degrade >98% of MSA at about 250 mg/L for several weeks.

What is claimed is:

1. A continuous process for the biodegradation of methanesulfonic acid comprising the steps of:
a) exposing an activated sludge culture to a carbon source or an energy source,
b) adding increasing concentrations of methanesulfonic acid in waste water to said sludge,
c) adjusting and maintaining the solution pH from about 6.5 to about 8.0,
d) maintaining the influent biological oxygen demand from about 250 to 3500 mg/L,
e) maintaining a hydraulic residence time from about 40 to about 60 hours,
f) maintaining a sludge density from about 4 to about 6 g/L, and
g) discharging methanesulfonic acid deficient effluent.

* * * * *

UNITED STATES PATENT AND TRADEMARK OFFICE
CERTIFICATE OF CORRECTION

PATENT NO: 6,063,280

DATED: 5/16/2000

INVENTOR(S): Robert Boyle et al.

It is certified that error appears in the above-identified patent and that said Letters Patent is hereby corrected as shown below:

On Title Page Item [73] Assignee should read "Merck & Co., Inc., Rahway, NJ, and Merck Sharp & Dohme (Ireland) Limited, Ballydine, Kilsheelan, Clonmel County, Tipperary, Ireland."

Signed and Sealed this

Twenty-seventh Day of March, 2001

*Attest:*

NICHOLAS P. GODICI

*Attesting Officer*   Acting Director of the United States Patent and Trademark Office